(12) United States Patent
Kusayanagi et al.

(10) Patent No.: US 11,551,485 B2
(45) Date of Patent: Jan. 10, 2023

(54) INFORMATION OUTPUT DEVICE AND INFORMATION OUTPUT METHOD

(71) Applicant: Nissan Motor Co., Ltd., Kanagawa (JP)

(72) Inventors: Yoshinori Kusayanagi, Kanagawa (JP); Takura Yanagi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 17/632,166

(22) PCT Filed: Aug. 1, 2019

(86) PCT No.: PCT/IB2019/000757
§ 371 (c)(1),
(2) Date: Feb. 1, 2022

(87) PCT Pub. No.: WO2021/019266
PCT Pub. Date: Feb. 4, 2021

(65) Prior Publication Data
US 2022/0319241 A1    Oct. 6, 2022

(51) Int. Cl.
*G07C 5/00*        (2006.01)
*G07C 5/08*        (2006.01)

(52) U.S. Cl.
CPC ............ *G07C 5/006* (2013.01); *G07C 5/008* (2013.01); *G07C 5/085* (2013.01); *G07C 5/0808* (2013.01); *G07C 5/0825* (2013.01)

(58) Field of Classification Search
CPC ...... G07C 5/006; G07C 5/008; G07C 5/0808; G07C 5/0825; G07C 5/085; G06Q 10/20
See application file for complete search history.

(56) References Cited

U.S. PATENT DOCUMENTS 9,520,006 B1    12/2016    Sankovsky et al.
9,697,503 B1 *   7/2017    Penilla .................. B60K 35/00
10,347,057 B1    7/2019    Kraft et al.

FOREIGN PATENT DOCUMENTS

JP    2003-132247 A    5/2003
JP    2005-085028 A    3/2005
(Continued)

*Primary Examiner* — Michael V Kerrigan
(74) *Attorney, Agent, or Firm* — Osha Bergman Watanabe & Burton LLP

(57) ABSTRACT

An information output device is provided, which includes a request acquisition unit that acquires a maintenance request for a vehicle; a user information acquisition unit that acquires information regarding each of a plurality of users; a message generator that generates a message associated with the maintenance request acquired by the request acquisition unit; and a message output unit that outputs the message generated by the message generator. The user information acquisition unit acquires maintenance records of the vehicle that are records of maintenance executed for the vehicle by the plurality of users. The message generator selects a presentation destination user to be presented with the message and generates the message based on a maintenance record of the presentation destination user among the maintenance records of the vehicle. The maintenance record of the presentation destination user is a record of the maintenance executed by the presentation destination user.

17 Claims, 9 Drawing Sheets

(56) References Cited

FOREIGN PATENT DOCUMENTS

| JP | 2007-022582 A | 2/2007 |
| JP | 2007-062494 A | 3/2007 |
| JP | 2011-048733 A | 3/2011 |
| JP | 2016-057770 A | 4/2016 |
| JP | 2018-207713 A | 12/2018 |

\* cited by examiner

FIG. 2

| Maintenance type | User (ID) | Number of executions |
|---|---|---|
| Charging | Father | 98 |
| | Mother | 11 |
| | Son | 2 |
| | Daughter | 0 |
| Tire pressure filling | ... | ... |
| Window washer fluid filling | ... | ... |
| Car washing | Father | 0 |
| | Mother | 0 |
| | Son | 10 |
| | Daughter | 0 |
| Vehicle inspection | Father | 1 |
| | Mother | 4 |
| | Son | 0 |
| | Daughter | 0 |

| Maintenance type | Point |
|---|---|
| Charging | 10 |
| Tire pressure filling | 3 |
| Window washer fluid filling | 3 |
| Car washing | 2 |
| Vehicle inspection/Checking | 5 |

| Maintenance type | User (ID) | Contribution degree |
|---|---|---|
| Charging | Father | 980 |
| | Mother | 110 |
| | Son | 20 |
| | Daughter | 0 |
| Tire pressure filling | ... | ... |
| Window washer fluid filling | ... | ... |
| Car washing | Father | 0 |
| | Mother | 0 |
| | Son | 20 |
| | Daughter | 0 |
| Vehicle inspection/Checking | Father | 7 |
| | Mother | 28 |
| | Son | 0 |
| | Daughter | 0 |

FIG. 5

| Maintenance type | Contribution degree | First message (Request message) | | Second message (Appreciation message) | |
|---|---|---|---|---|---|
| | | First half | Last half | First half | Last half |
| Charging | 501 or more | As usual, | please charge. | Always | thank you for charging. |
| | 101 to 500 | - | Please charge. | - | Thank you for charging. |
| | 0 to 100 | As your first experience, | please charge. | As your first experience, | thank you for charging. |
| | ... | ... | ... | ... | ... |
| | ... | ... | ... | ... | ... |
| Vehicle inspection /Checking | 31 or more | Now about charging. | Please assign Mr./Ms. B. | For a long time, | thank you for checking. |
| | 21 to 30 | Now about charging. | Please assign the usual store. | Always | thank you for checking. |
| | 0 to 20 | Now about charging. | Please assign the store A where we purchased. | As your first experience, | thank you for checking. |

INFORMATION OUTPUT DEVICE AND INFORMATION OUTPUT METHOD

TECHNICAL FIELD

The present invention relates to an information output device and an information output method.

BACKGROUND ART

A vehicle that expresses emotions is known, which is configured to be capable of executing external charging for an onboard battery with electric power from outside the vehicle (e.g., Patent Document 1). The vehicle described in Patent Document 1 includes an operation device and a control device. The control device makes a notification for prompting the user to execute the external charging when the SOC of the battery is a predetermined value or less. Then, when the user executes the external charging after the notification, the control device controls the operation device to execute a first operation (e.g., an operation corresponding to an emotion such as a sense of joy or appreciation). On the other hand, when the user does not execute the external charging after the notification, the control device controls the operation device to execute a second operation (e.g., an operation corresponding to an emotion such as a sense of desolation or dissatisfaction) different from the first operation.

PRIOR ART DOCUMENT

[Patent Document]
[Patent Document 1] JP2018-207713A

SUMMARY OF INVENTION

Problems to be Solved by Invention

In the above prior art, a simplified message prompting execution of external charging is made without considering the attribute of the user. However, a message that can motivate the user to execute maintenance of the vehicle, such as external charging, may be different depending on the attribute of the user. When notified of such a simplified message, therefore, the user cannot be effectively motivated to execute maintenance of the vehicle, and the maintenance may not be executed.

A problem to be solved by the present invention is to provide an information output device and an information output method that are able to increase the possibility that when a user is prompted to perform maintenance of a vehicle, the maintenance may be executed.

Means for Solving Problems

The present invention solves the above problem through acquiring a maintenance request for a vehicle, acquiring information regarding each of a plurality of users who can use the vehicle, generating a message associated with the maintenance request, outputting the generated message, acquiring maintenance records of the vehicle that are records of maintenance executed for the vehicle by the plurality of users, selecting, from among the plurality of users, a presentation destination user to be presented with the message, and generating the message based on a maintenance record of the presentation destination user among the maintenance records of the vehicle. The maintenance record of the presentation destination user is a record of the maintenance executed by the presentation destination user.

Effect of Invention

According to the present invention, the presentation destination user is selected, and the message based on the maintenance record of the presentation destination user is output; therefore, when the maintenance is prompted, the possibility that the maintenance is executed can be increased.

BRIEF DESCRIPTION OF DRAWINGS

FIG. 2 illustrates an example of maintenance records of a vehicle.

FIG. 3 is a diagram for describing a method of setting a contribution degree.

FIG. 4 illustrates an example of the contribution degree.

FIG. 5 is a diagram for describing a first message and a second message.

MODE(S) FOR CARRYING OUT THE INVENTION

Hereinafter, an embodiment of the information output device and information output method according to the present invention will be described with reference to the drawings. In the present embodiment, an information output device equipped in a vehicle will be exemplified and described.

Figure 1:
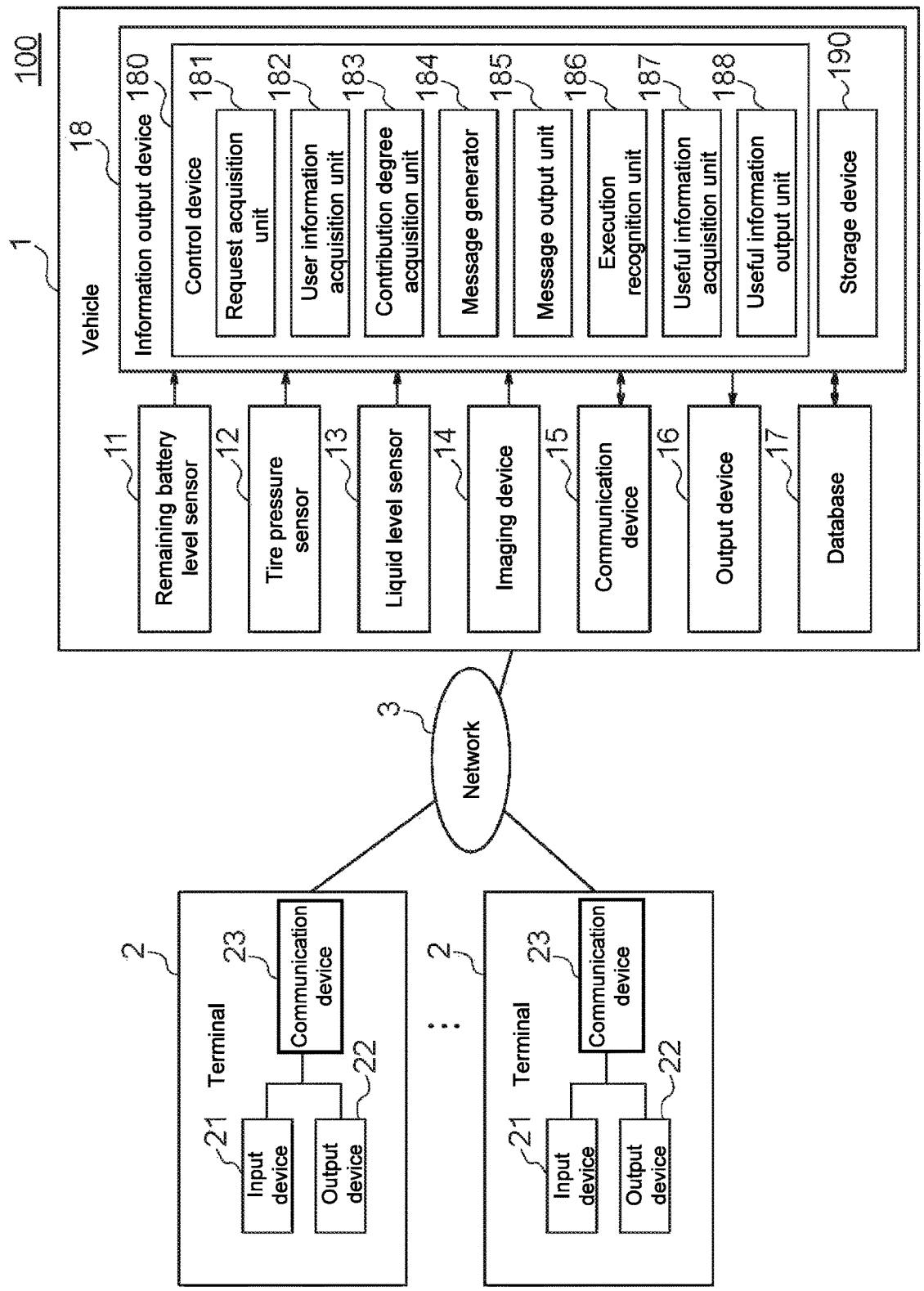
FIG. 1 is a block diagram illustrating an example of an information presentation system including an information output device according to an embodiment of the present invention.

FIG. 1 is a block diagram illustrating an example of an information presentation system 100 that includes an information output device 18 according to the present embodiment. As illustrated in FIG. 1, the information presentation system 100 in the present embodiment includes a vehicle 1, a plurality of terminals 2, and a network 3 that constitutes a telecommunication network. The system of the present embodiment is a system that presents, in a scene in which two or more users use one vehicle 1, information regarding maintenance of the vehicle 1 to one or more of the users.

In the present embodiment, the user refers to a person who uses the vehicle 1, and examples of the user may include persons of all attributes. The user does not have to be a subject who drives the vehicle 1. In the present embodiment, the maintenance refers to a maintenance work and/or a checking (inspection) work for the vehicle 1. FIG. 1 illustrates one vehicle as the vehicle 1, but the number of vehicle(s) 1 is not particularly limited in the system of the present embodiment. The system of the present embodiment may include a plurality of vehicles 1 and a plurality of terminals 2 that can communicate with each vehicle 1.

On the premise of the system of the present embodiment, persons who can be the users carry respective terminals 2 that are brought or used on a daily basis. Examples of such types of terminals 2 for use include smartphones, mobile phones, and portable computers. The terminals 2 will be described later.

Scenes in which the system of the present embodiment is applied include, but are not limited to, a scene in which, for example, a family (e.g., a family of four; a father, a mother, a son, and a daughter) uses one vehicle 1. In this case, even when the owner of the vehicle 1 is a specific person (e.g., a father) of the family, all the members of the family correspond to the users of the vehicle 1, provided that they can use the vehicle 1. In the following description, the system of the present embodiment will be described with reference to an example in which a family of four; a father, a mother, a son, and a daughter, uses the vehicle 1.

First, the terminals 2 will be described. As illustrated in FIG. 1, each terminal 2 includes an input device 21, an output device 22, and a communication device 23.

The input device 21 is an instrument operated by a user and is used for performing various operations such as activation of an application for maintenance of the vehicle, selection of information to be presented to the user, and input of a determination made by the user. Examples of the input device 21 include devices to which input by the user's manual operation is possible, such as a touch panel disposed on a display, buttons arranged on a keyboard, and a joystick. The input device 21 is not limited to a device to which input by the user's manual operation is possible, and may be a device to which input by the user's voice is possible, such as a microphone. The input information input to the input device 21 is output to the communication device 23.

The output device 22 is an instrument that presents information regarding maintenance of the vehicle 1 to the user and is used, for example, for performing display on a screen and guidance by sound or voice. The information output from the communication device 23 is input to the output device 22. The output device 22 presents the information input from the communication device 23 to the user. Examples of the output device 22 include a display capable of outputting an image or video. Additionally or alternatively, the output device 22 may be a speaker capable of outputting sound or voice. Additionally or alternatively, the output device 22 may be composed of a display and a speaker. The types of display and speaker are not particularly limited. Details of the information presented to the user from the output device 22 will be described later.

The communication device 23 is an instrument that communicates with the vehicle 1 via the network 3. The communication device 23 exchanges information regarding, for example, maintenance of the vehicle 1 with the vehicle 1. For example, when a message prompting maintenance of the vehicle 1 is transmitted from a communication device 15 of the vehicle 1 to the communication device 23 of the terminal 2, the communication device 23 outputs the message received from the vehicle 1 to the output device 22. This allows the user to confirm the message, which prompts maintenance of the vehicle 1, via the output device 22.

Now suppose, for example, that in response to the message prompting maintenance, the user who carries the terminal 2 has executed the maintenance of the vehicle 1 in accordance with the content of the message. The user performs a predetermined operation on the input device 21 to record the fact that the maintenance has been completed, on the application for maintenance of the vehicle. When the completion information indicating that the maintenance has been completed is input to the input device 21, the completion information is input to the communication device 23 from the input device 21. The communication device 23 transmits the completion information to the communication device 15 of the vehicle 1. This allows the information output device 18 equipped in the vehicle 1, which will be described later, to recognize that the maintenance of the vehicle 1 has been executed by the user to whom the message was presented.

In addition, the communication device 23 exchanges positional information of users with the vehicle 1. For example, when the terminal 2 includes a positional information acquisition device (not illustrated) such as a GPS receiver, the communication device 23 transmits the current positional information of the terminal 2 to the communication device 15 of the vehicle 1. This allows the information output device 18, which will be described later, to recognize the current position of a user who carries the terminal 2. How to express the positional information is not particularly limited, and the positional information may be represented, for example, by the latitude and longitude on a map.

The vehicle 1 will then be described. The vehicle 1 is, for example, a general automobile that is equipped with a navigation system and driven by a person. Alternatively, the vehicle 1 may be, for example, an automobile that is equipped with a navigation system and has a function of controlling travel control (speed control and steering control) in an automated or autonomous manner and that is driven by a person. Alternatively, the vehicle 1 may be, for example, an automobile that is equipped with a navigation system and has a function of controlling travel control (speed control and steering control) in an automated or autonomous manner and that is driven without a driver. The present embodiment will be described with reference to an example in which the vehicle 1 is a general automobile that is equipped with a navigation system and driven by a person.

In the present embodiment, the power source of the vehicle 1 is not particularly limited. The vehicle 1 may be an electric automobile that travels using electricity as the energy source and a motor as the power source. Alternatively, the vehicle 1 may be a gasoline-powered vehicle that travels by using a gasoline engine as the power source. Alternatively, the vehicle 1 may be an electric hybrid vehicle that has an engine and a motor as the power sources. The present embodiment will be described with reference to an example in which the vehicle 1 is an electric automobile that requires external charging.

As illustrated in FIG. 1, the vehicle 1 includes a remaining battery level sensor 11, a tire pressure sensor 12, a liquid level sensor 13, an imaging device 14, the above-described communication device 15, an output device 16, a database 17, and the above-described information output device 18. These devices or systems are connected by a controller area network (CAN) or other onboard LAN to exchange information with each other.

The remaining battery level sensor 11 is provided in a battery unit of the vehicle 1, for example, and detects the remaining charge of the battery (e.g., a lithium ion battery) of the vehicle 1. Information on the remaining charge of the battery detected by the remaining battery level sensor 11 is output to the information output device 18.

The tire pressure sensor 12 is provided, for example, on each tire of the vehicle 1 and detects the air pressure of the tire of the vehicle 1. Information on the tire pressure detected by the tire pressure sensor 12 is output to the information output device 18.

The liquid level sensor 13 is provided, for example, in a tank for storing the window washer fluid of the vehicle 1 and detects the remaining amount of the window washer fluid of the vehicle 1. Information on the window washer fluid detected by the liquid level sensor 13 is output to the information output device 18. In the present embodiment, the detection target of the liquid level sensor 13 is described as the window washer fluid, but the detection target of the liquid level sensor 13 is not limited to this. For example, the liquid level sensor 13 may detect the remaining amount of the cooling water, battery liquid, or lubricating oil. In such a case, the liquid level sensor 13 is provided, for example, in each tank in which the detection target is stored. The liquid level sensor 13 may detect the remaining amount of at least one of the window washer fluid, cooling water, battery liquid, and lubricating oil.

The imaging device 14 is provided, for example, outside the vehicle 1 and captures an image of the windshield of the vehicle 1. Information on the image captured by the imaging device 14 is output to the information output device 18. The imaging target of the imaging device 14 is not limited to the windshield. It suffices that the imaging device 14 can image the outer surface state of the window glasses of the vehicle 1. The imaging device 14 may be provided, for example, at a position from which the rear glass and/or door glasses can be imaged, and may capture images of these glasses.

The remaining battery level sensor 11, the tire pressure sensor 12, the liquid level sensor 13, and the imaging device 14 are instruments that are provided in the vehicle 1 and acquire information (vehicle information) indicating the current state of the vehicle 1. These instruments are therefore also collectively referred to as a vehicle information acquisition device.

The communication device 15 is an instrument capable of communicating with the terminals 2 via the network 3. The communication device 15 receives information transmitted from the terminals 2, outputs the transmitted information to the information output device 18, and transmits the information input from the information output device 18 to the terminals 2. Examples of the communication device 15 include a device having a mobile communication function of 4G LTE and a device having a Wifi communication function.

Additionally or alternatively, the communication device 15 can be connected to the Internet via the network 3. Additionally or alternatively, the communication device 15 can communicate with a server provided outside the vehicle 1 via the network 3.

The output device 16 is an instrument that presents information regarding maintenance of the vehicle 1 to an occupant of the vehicle 1 and is used, for example, for display on a screen and guidance by sound or voice. The information output from the information output device 18 is input to the output device 16. The output device 16 presents the information, which is output from the information output device 18, to an occupant of the vehicle 1. Examples of the output device 16 include a display capable of outputting an image or video. The output device 16 is not limited to a device from which an occupant of the vehicle 1 can visually obtain information, and may be a speaker capable of outputting sound or voice. The types of displays and speakers are not particularly limited. The output device 16 may be composed of a display and a speaker. Details of the information presented from the output device 16 to an occupant of the vehicle 1 will be described later.

The database 17 stores maintenance records of vehicle 1. The maintenance records of the vehicle 1 refer to records of maintenance executed for the vehicle 1 by a plurality of users. The maintenance records of the vehicle 1 are composed, for example, of items of the maintenance types, the user names who executed the maintenance or the user IDs, and the number of executions. The maintenance types include, but are not limited to, charging, tire pressure filling, window washer fluid filling, car washing, checking, and vehicle inspection.

FIG. 2 illustrates an example of the maintenance records of the vehicle 1. As illustrated in FIG. 2, the maintenance records of the vehicle 1 are first classified by the items of "maintenance types." The items of "maintenance types" are classified by the items of "user IDs." The "user IDs" are associated with the items of the "number of executions." The "number of executions" may be different for each user ID and represents the number of times each of a plurality of users has executed the maintenance.

The maintenance records of users will then be described with reference to FIG. 2. In the present embodiment, the maintenance records of users are records of maintenance of the vehicle 1 executed by the users. The maintenance record of a user constitutes one record with one "maintenance type," one "user ID," and one "number of executions." In other words, the maintenance record of a user is a part of the maintenance records of the vehicle 1. For example, in an example of FIG. 2, the maintenance record of a user is represented by a record that "the number of times the father has executed the charging is 98" with "Charging (maintenance type), Father (user ID), and 98 (number of executions)." In another example of FIG. 2, the maintenance record of a user is represented by a record that "the number of times the father has executed the car washing is 0 (zero)" with "Car washing (maintenance type), Father (user ID), and 0 (number of executions)." In still another example of FIG. 2, the maintenance record of a user is represented by a record that "the number of times the son has executed the car washing is 10" with "Car washing (maintenance type), Son (user ID), and 10 (number of executions)." Thus, the maintenance records of the vehicle 1 are composed of the maintenance records of respective users.

As illustrated in FIG. 2, users who tend to execute maintenance differ depending on the maintenance type. The example of FIG. 2 indicates that the charging is most often performed by the father in the family of four (four users). The example also indicates that the car washing is most often performed by the son of the family of four. The example further indicates that the vehicle inspection is most often conducted by the mother in the family of four. Although omitted in FIG. 2, also for the tire pressure filling and the window washer fluid filling, the number of executions is stored for each user. The situation in which the number of executions differs depending on the maintenance type is based on the number of maintenance requests for the vehicle 1. The maintenance requests for the vehicle 1 will be described later.

The database 17 outputs the maintenance records of the vehicle 1 to the information output device 18 in response to the request from the information output device 18, which will be described later. Update information of the maintenance records of users is also input to the database 17 from the information output device 18. The database 17 updates the maintenance records of users corresponding to the update information. This allows the maintenance records of the vehicle 1 to be updated. For example, in the example of FIG. 2, when the update information for the maintenance record of a user that "the charging was executed by the father" is input to the database 17, the database 17 increments the number of executions corresponding to the maintenance type being "Charging" and the user ID being "Father." This allows the maintenance records of the vehicle 1 to be updated.

Here, the "maintenance of the vehicle 1 executed by a user" will be described. The "maintenance of the vehicle 1 executed by a user" refers to maintenance in which the user is directly or indirectly involved. For example, the "maintenance of the vehicle 1 executed by a user" involves any of a case in which the user himself/herself executes the charging work and a case in which the user requests a worker to execute the charging work.

From another aspect, the "maintenance of the vehicle 1 executed by a user" refers to maintenance which the user executed in response to the maintenance request for the vehicle 1 acquired by a request acquisition unit 181 of the information output device 18, which will be described later. In other words, the "maintenance of the vehicle 1 executed by a user" is the maintenance requested by the maintenance request and executed by the user.

The database 17 also stores, in addition to the maintenance records of the vehicle 1, a contribution degree of a user to the maintenance or improvement of the vehicle 1, which is a contribution degree based on the maintenance record of the user. The contribution degree corresponds to the maintenance record of a user and is stored for each user.

FIG. 3 is a diagram for describing a method of setting the contribution degree, and FIG. 4 illustrates an example of the contribution degree. The database 17 stores a point that is set for each maintenance type as illustrated in FIG. 3. The point for each type is a predetermined value. For example, the point for each type is set in accordance with a degree of importance, a degree of urgency, a degree of difficulty, etc. of the maintenance. The database 17 stores the contribution degree of a user based on the point illustrated in FIG. 3. The example of FIG. 4 illustrates the contribution degrees corresponding to the maintenance records of the vehicle 1 of FIG. 2. As illustrated in the example of FIG. 4, the value obtained by multiplying the number of executions illustrated in FIG. 2 by the corresponding point illustrated in FIG. 3 is stored in the database 17 as the contribution degree. Thus, the value obtained by multiplying the number of executions by the point is adopted as the contribution degree, and the contribution degree can thereby be treated as a value that takes into account the number of executions of maintenance and the degree of importance of the maintenance.

Although not illustrated in FIG. 1, the vehicle 1 includes a navigation system. The navigation system is a system that indicates, based on the current positional information of the vehicle 1, the travel route from the current position of the vehicle 1 to a destination to guide the occupants (including the driver) of the vehicle 1. The navigation system includes a global positioning system (GPS) receiver that acquires the positional information indicating the current position of the vehicle 1 and a map database that stores map information and traffic rule information. The navigation system outputs information on the current position and travel route of the vehicle 1 to the information output device 18.

The GPS receiver receives radio waves transmitted from a plurality of satellite communications to acquire the positional information of the vehicle 1. In addition, the GPS receiver can detect changes in the positional information of the subject vehicle by periodically receiving the radio waves transmitted from the plurality of satellite communications.

The map information and traffic rule information stored in the map database are defined by nodes and links connecting the nodes (also referred to as road links). The map information includes, for example, the positional information of a charging station that is a station for charging the battery of the vehicle 1. The traffic rule information refers to traffic rules that vehicles must observe when traveling. For example, unlike the present embodiment, when the vehicle 1 is an automobile that controls the travel control in an automated or autonomous manner and that is driven without a driver, the vehicle 1 is controlled to travel so as to observe the traffic rules. In this case, the vehicle 1 is configured to avoid interference with other vehicles and objects and stop the automated or autonomous control when an occupant of the vehicle 1 intervenes in an operation relating to the driving.

The information output device 18 of the present embodiment is composed of a computer provided with hardware and software. Specifically, the information output device 18 is composed of a read only memory (ROM) that stores programs, a central processing unit (CPU) that executes the programs stored in the ROM, and a random access memory (RAM) that serves as an accessible storage device. As substitute for or in addition to the CPU, a micro processing unit (MPU), a digital signal processor (DSP), an application specific integrated circuit (ASIC), a field programmable gate array (FPGA), or the like can also be used as the operation circuit. A control device 180 illustrated in FIG. 1 corresponds to the CPU, and a storage device 190 illustrated in FIG. 1 corresponds to the ROM and RAM.

As illustrated in FIG. 1, the control device 180 includes a request acquisition unit 181, a user information acquisition unit 182, a contribution degree acquisition unit 183, a message generator 184, a message output unit 185, an execution recognition unit 186, a useful information acquisition unit 187, and a useful information output unit 188. These blocks achieve respective functions, which will be described below, by the software established in the ROM.

The function of the request acquisition unit 181 will be described. The request acquisition unit 181 acquires a maintenance request for the vehicle 1. The maintenance request for the vehicle 1 means that the vehicle 1 needs maintenance. For example, the request acquisition unit 181 acquires the detection results detected by the remaining battery level sensor 11, the tire pressure sensor 12, and the liquid level sensor 13 at a predetermined cycle. In addition, for example, the request acquisition unit 181 acquires the captured image captured by the imaging device 14 at a predetermined cycle. The request acquisition unit 181 determines, based on the acquired detection results and captured image, whether or not the vehicle 1 needs maintenance. It is assumed that the request acquisition unit 181 acquires a maintenance request from the vehicle 1 at the timing when a determination is made that the vehicle 1 needs maintenance.

For example, when the remaining battery level of the vehicle 1 becomes lower than a predetermined reference value, the request acquisition unit 181 determines that the vehicle 1 needs external charging as the maintenance. Additionally or alternatively, when the tire pressure of the vehicle 1 becomes lower than a predetermined reference value, for example, the request acquisition unit 181 determines that the vehicle 1 needs filling with the air pressure as the maintenance. Additionally or alternatively, when the remaining amount of the window washer fluid of the vehicle 1 becomes lower than a predetermined reference value, for example, the request acquisition unit 181 determines that the vehicle 1 needs filling with the window washer fluid as the maintenance. Additionally or alternatively, for example, the request acquisition unit 181 executes image processing on the captured image of a window glass to analyze a degree of adhesion of dirt on the window glass. When the degree of adhesion of dirt on a window glass becomes higher than a predetermined reference value, the request acquisition unit 181 determines that the vehicle 1 needs car washing as the maintenance. Each of the above reference values is a value for determining that maintenance is necessary, and is a predetermined value.

The function of the user information acquisition unit 182 will then be described. The user information acquisition unit 182 acquires information regarding each of a plurality of users who can use the vehicle 1. The information regarding a user includes at least the maintenance record of the user and the positional information of the user. The user information acquisition unit 182 acquires the maintenance records of the vehicle 1 from the database 17 to acquire the maintenance record of each user. In addition, the user information acquisition unit 182 acquires the positional information of a terminal 2 from the terminal 2 carried by each user to acquire the positional information of the user.

In addition, the user information acquisition unit 182 specifies a user who is in the vehicle 1 among a plurality of users. For example, the user information acquisition unit 182 compares the positional information of the vehicle 1 with the positional information of each user to specify a user, among the plurality of users, located at the same position as the current position of the vehicle 1 as the user who is in the vehicle 1. Now suppose, for example, that there is a wireless standard (e.g., Bluetooth (trademark)) that is different from that of the network 3 and capable of communication only in the interior of the vehicle 1. Then, when the vehicle 1 and one terminal 2 are in a state in which they can communicate with each other in accordance with that specific wireless standard, the user information acquisition unit 182 specifies the user carrying the one terminal 2 as the user who is in the vehicle 1. The method of specifying a user who is in the vehicle 1 is merely an example and is not particularly limited.

The function of the contribution degree acquisition unit 183 will then be described. The contribution degree acquisition unit 183 acquires the contribution degree of a user selected by the message generator 184, which will be described later, from the database 17. The user selected by the message generator 184 is also referred to as a presentation destination user. For example, the contribution degree acquisition unit 183 acquires the contribution degree of one user in accordance with the maintenance type as illustrated in the example of FIG. 4 from the database 17. The contribution degree acquisition unit 183 may acquire one or more contribution degrees corresponding to one or more maintenance types for the presentation destination user.

The function of the message generator 184 will then be described. The message generator 184 generates a message corresponding to the maintenance request for the vehicle 1. The message generator 184 executes a user selection process of selecting, from among a plurality of users, a presentation destination user to be presented with a message and a message generation process of generating the message corresponding to the maintenance record of the presentation destination user.

The user selection process executed by the message generator 184 will first be described. In the present embodiment, it is assumed that there is one presentation destination user. The message generator 184 selects the presentation destination user based on the record of maintenance executed by each of the plurality of users. For example, the message generator 184 preferentially selects, as the presentation destination user, a user whose number of times of executing the maintenance requested by the maintenance request is larger among the plurality of users.

In the case of the example of the maintenance records illustrated in FIG. 2, the message generator 184 selects, as the presentation destination user, the "father" who has the highest number of times of executing the charging which is requested by the maintenance request. Through this operation, a message for prompting maintenance can be presented to a user who has a relatively large number of executions and has an abundant maintenance experience, that is, a user who is highly likely to respond to a request for sudden maintenance without hesitation. In other words, it is possible to prevent a message for prompting maintenance from being presented to a user who has no or relatively little experience of maintenance. To determine whether or not a user has an abundant maintenance experience, the message generator 184 may compare, for each user, the number of executions of the maintenance with a predetermined reference number of times. The message generator 184 may preferentially select, as the presentation destination user, a user whose number of executions of maintenance is larger than the predetermined reference number of times. The predetermined reference number of times is a number of times for determining whether or not a user has an abundant maintenance experience, and is a predetermined number of times.

Additionally or alternatively, the message generator 184 may select the presentation destination user based on the positional information of each of a plurality of users. For example, the message generator 184 preferentially selects a user whose position is closer to the vehicle 1 among the plurality of users as the presentation destination user. Now suppose, for example, that the vehicle 1 is in a standby state at home. In this case, in response to the request for vehicle inspection from the vehicle 1, the message generator 184 selects, as the presentation destination user, the "mother" who is at home and is closest to the vehicle 1. Through this operation, a message for prompting maintenance can be presented to a user who can relatively quickly arrive at the vehicle 1 which needs maintenance. In other words, it is possible to prevent a message for prompting maintenance from being presented to a user (in the example of FIG. 2, for example, the "father" at work) who is located at a place away from the vehicle 1.

Additionally or alternatively, the message generator 184 may select a user who is in the vehicle 1 as the presentation destination user. For example, when the user who is in the vehicle 1 is the "son," the message generator 184 selects the user "son" who is in the vehicle 1 as the presentation destination user. Through this operation, a message for prompting maintenance can be presented to a user who is in the vehicle 1, which needs maintenance, and can relatively respond to a sudden request for maintenance. In other words, it is possible to prevent a message for prompting maintenance from being presented to a user who is not in the vehicle 1 and cannot perceive the situation of the vehicle 1.

The above-described three selection methods have been described as the methods for selecting a user, but the message generator 184 can select the presentation destination user by at least one selection method. The message generator 184 may select the presentation destination user by any one of the above-described three selection methods or may combine two or more of the three selection methods to select the presentation destination user. It is preferred to preliminarily set the priority order of the selection methods to be applied when combining two or more selection methods.

The message generation process executed by the message generator 184 will then be described. In the present embodiment, the message generator 184 generates a first message in response to the maintenance request with a trigger that the maintenance request is acquired by the request acquisition unit 181. The first message is a message for prompting the presentation destination user to execute the maintenance or a message for requesting the presentation destination user to execute the maintenance. In addition, the message generator 184 generates a second message with a trigger that the execution recognition unit 186, which will be described later, recognizes that the maintenance of the vehicle 1 has been executed by the presentation destination user. The second message is a message of appreciation to the user. More specifically, the second message is a message of appreciation to the presentation destination user who has responded to the first message.

The message generator 184 generates the first message and the second message in accordance with the attribute of the presentation destination user. In the present embodiment, the message generator 184 generates the first message and the second message in accordance with the number of times the maintenance has been executed by the presentation destination user and/or the contribution degree of the presentation destination user to the maintenance or improvement of the state of the vehicle 1. Specifically, the message generator 184 generates the first message and the second message using an expression in accordance with the number of executions by the presentation destination user. Additionally or alternatively, the message generator 184 generates the first message and the second message using an expression in accordance with the contribution degree of the presentation destination user. First, an example of a method of generating the first message and the second message will be described. For example, the message generator 184 acquires a model (also referred to as a template) of the first message corresponding to the maintenance type and the contribution degree from the database 17. Then, the message generator 184 generates the first message, for example, by adding information such as the name and/or maintenance location of the presentation destination user to the template of the first message. In addition, for example, the message generator 184 acquires a template of the second message in accordance with the maintenance type and the contribution degree from the database 17. Then, the message generator 184 generates the second message, for example, by adding information such as the name and/or maintenance location of the presentation destination user to the template of the second message. The expression in accordance with the number of executions or the contribution degree of the presentation destination user will be described later.

In addition, for a user who has no or relatively little experience of maintenance, the message generator 184 makes the first message include a work procedure manual (also referred to as a tutorial) in which the work procedure of maintenance of the vehicle 1 is explained. For example, the message generator 184 determines, based on the maintenance record of the presentation destination user, whether or not the number of times the presentation destination user has executed the maintenance requested by the maintenance request is larger than a preliminarily set reference number of times. Then, when a determination is made that the number of executions is not larger than the reference number of times, the message generator 184 makes the first message include the work procedure manual. At this time, the message generator 184 generates the first message using the expression in accordance with the number of executions which is determined to be not larger than the reference number of times.

Additionally or alternatively, the message generator 184 may generate the first message including the work procedure manual in accordance not only with the number of executions but also with an execution frequency. For example, the message generator 184 may determine, based on the maintenance record of the presentation destination user, whether or not the execution frequency of the presentation destination user for the requested maintenance is higher than a preliminarily set reference frequency. Then, when a determination is made that the execution frequency is not higher than the reference frequency, the message generator 184 may make the first message include the work procedure manual. The above-described reference number of times is a number of times for determining whether or not the work procedure manual is to be included, and is a predetermined number of times. The above-described reference frequency is a frequency also for determining whether or not the work procedure manual is to be included, and is a predetermined frequency.

Details of the first message and the second message will be described with reference to FIG. 5. FIG. 5 is a diagram for describing the first message and the second message.

As illustrated in the example of FIG. 5, the message generator 184 generates the first message and the second message corresponding to the maintenance type and the contribution degree. In the present embodiment, the message generator 184 generates the first message and the second message using the expression method in accordance with the contribution degree of the presentation destination user. The following description will be made as an example for the first message and the second message which are expressed by the expression method in accordance with the contribution degree of the presentation destination user, but the message generator 184 may generate the first message and the second message using the expression in accordance with the "number of executions" by the presentation destination user as substitute for the "contribution degree" of the presentation destination user. That is, in the following description of the first message and the second message, the description regarding the "contribution degree" may be read as the description regarding the "number of executions."

For example, when the contribution degree of the presentation destination user to "charging" is relatively high (when the contribution degree of FIG. 5 is "501 or more"), the message generator 184 generates, as the first message, a message in which the adverb phrase "as usual" is added before "please charge" which expresses the request. In addition, the message generator 184 generates, as the second message, a message in which the adverb "always" is added before "thank you for charging."

On the other hand, when the contribution degree of the presentation destination user to "charging" is relatively low (when the contribution degree of FIG. 5 is "0 to 100"), for example, the message generator 184 generates, as the first message, a message in which the adverb phrase "as your first experience" is added before "please charge" which expresses the request. Furthermore, the message generator 184 makes the first message include a tutorial that is the work procedure manual for charging. In addition, the message generator 184 generates, as the second message, a message in which the adverb phrase "as your first experience" is added before "thank you for charging."

Additionally or alternatively, when the contribution degree of the presentation destination user to "vehicle inspection/checking" is relatively high (when the contribution degree of FIG. 5 is "31 or more"), for example, the message generator 184 generates, as the first message, a message in which the name of worker who will execute the checking, "Mr./Ms. B," is added after "please assign" which expresses the request. In addition, the message generator 184 generates, as the second message, a message in which the adverb phrase "for a long time" is added before "thank you for checking."

On the other hand, when the contribution degree of the presentation destination user to "vehicle inspection/checking" is relatively low (when the contribution degree of FIG. 5 is "0 to 20"), for example, the message generator 184 generates, as the first message, a message in which the name of the store where the checking is to be executed, "the store A where we purchased," is added after "please assign" which expresses the request. In addition, the message generator 184 generates, as the second message, a message in which the adverb phrase "as your first experience" is added before "thank you for checking."

Thus, in the present embodiment, the message generator 184 not only merely expresses the request and appreciation, but also uses the message expression method in accordance with the number of executions or contribution degree of the presentation destination user. Specifically, the message generator 184 changes the expression method for the request and appreciation in accordance with the number of executions or contribution degree of the presentation destination user. For example, when the number of executions by the presentation destination user is relatively large, the message generator 184 expresses the request and appreciation using an adverb or adverb phrase that expresses that the number of executions or execution frequency of maintenance is large or high, such as "as usual" or always." Additionally or alternatively, when the number of executions by the presentation destination user is relatively small, for example, the message generator 184 expresses the request and appreciation using an adverb phrase that expresses that the number of executions or execution frequency of maintenance is small or low, such as "as your first experience." Additionally or alternatively, when the contribution degree of the presentation destination user is relatively high, for example, the message generator 184 expresses the request and appreciation using an adverb or adverb phrase that expresses that the number of executions or execution frequency of maintenance is large or high, such as "as usual" or always." Additionally or alternatively, when the contribution degree of the presentation destination user is relatively low, for example, the message generator 184 expresses the request and appreciation using an adverb phrase that expresses that the number of executions or execution frequency of maintenance is small or low, such as "as your first experience." Thus, by using the expression method in accordance with the number of executions or contribution degree of the presentation destination user, the presentation destination user is likely to feel that the vehicle 1 takes into account his/her own situation to present the request and appreciation, for example, rather than being merely presented with "please charge" or "thank you for charging." As a result, the presentation destination user is likely to become attached to the vehicle 1.

The sentences of the first message and second message illustrated in FIG. 5 represent an example and are not particularly limited. In FIG. 5, three messages are listed in accordance with the contribution degree, but the number of messages in accordance with the number of executions or the contribution degree is not particularly limited. An example of using the expression method in accordance with the number of executions or contribution degree of the presentation destination user has been described, but another expression method may be used in accordance with the execution frequency of the presentation destination user as substitute for the number of executions and contribution degree of the presentation destination user.

The functions of the other blocks which constitute the control device 180 will be described with reference again to FIG. 1. The message output unit 185 outputs at least the first message to a user. When it is recognized that the maintenance has been performed by the presentation destination user, the message output unit 185 outputs the second message generated by the message generator 184 in addition to the first message. The recognition that the maintenance has been executed will be described later.

The message output unit 185 outputs the message to an output destination in accordance with the position of the presentation destination user. For example, when the presentation destination user is not in the vehicle 1, the message output unit 185 transmits the message to the terminal 2 carried by the presentation destination user via the communication device 15. The form for transmitting the message to the terminal 2 is not particularly limited and may be an e-mail or may also be an image, video data, or audio data. On the other hand, when the presentation destination user is in the vehicle 1, for example, the message output unit 185 outputs the message to the output device 16.

With regard to the first message, the message output unit 185 outputs the first message at the timing in accordance with the maintenance record of the presentation destination user. In the present embodiment, when the maintenance type requested in the maintenance request corresponds to charging, the message output unit 185 sets the timing to output the first message in accordance with the number of executions or execution frequency of the maintenance executed by the presentation destination user.

Now suppose, for example, that the request acquisition unit 181 acquires a request of charging because the remaining battery level decreases while the vehicle 1 is traveling. Also suppose that the message generator 184 selects a user who is in the vehicle 1 as the presentation destination user. In this case, the message output unit 185 sets the output timing of the first message in accordance with the number of times of charging executed by the presentation destination user. Specifically, the message output unit 185 sets the output timing of the first message so that the timing to output the first message to a presentation destination user who is unfamiliar with charging is earlier than the timing to output the first message to a presentation destination user who is familiar with charging. More specifically, the message output unit 185 sets the output timing of the first message so that the timing to output the first message to a user who has a relatively small number of past charging is earlier than the timing to output the first message to a presentation destination user who has a relatively large number of past charging.

An example of a method of setting the output timing of the first message will be described. For example, the message output unit 185 confirms the travelable distance of the vehicle 1 corresponding to the remaining battery level and compares the travelable distance with a threshold value. When the number of times the presentation destination user has executed charging is larger than a predetermined reference number of times, the message output unit 185 compares the travelable distance of the vehicle 1 with a first threshold value. On the other hand, when the number of times the presentation destination user has executed charging is not larger than the predetermined reference number of times, the message output unit 185 compares the travelable distance of the vehicle 1 with a second threshold value. The second threshold value is a value larger than the first threshold value. The message output unit 185 sets, as the output timing of the first message, the timing at which the travelable distance of the vehicle 1 becomes equal to or less than the first threshold value or the second threshold value. The first message is output at the timing in accordance with the maintenance record of the presentation destination user, and therefore the timing at which a user who is unfamiliar with charging confirms the first message can be prevented from getting delayed than a user who is familiar with charging. Moreover, even a user who does not know the location of a charging stand because he/she is unfamiliar with charging can respond to the first message in good time.

The function of the execution recognition unit 186 will then be described. The execution recognition unit 186 recognizes that the maintenance of the vehicle 1 has been executed by the presentation destination user. For example, the execution recognition unit 186 compares the remaining battery level after outputting the first message with that before outputting the first message. When the remaining battery level after outputting the first message has reached the full charge, the execution recognition unit 186 recognizes that the charging has been executed by the presenting destination user. Additionally or alternatively, the execution recognition unit 186 may recognize that the maintenance has been executed, from the completion information transmitted from the terminal 2. For example, when an operation of recording the completion of maintenance is performed by the presentation destination user on the application for maintenance of the vehicle 1, the completion information of maintenance is input from the terminal 2 to the execution recognition unit 186. The execution recognition unit 186 may confirm that the completion information has been input, thereby to recognize that the maintenance has been executed by the presentation destination user.

In addition, when recognizing that the maintenance of the vehicle 1 has been performed by the presentation destination user, the execution recognition unit 186 stores the recognized content in the database 17 as the maintenance record of the presentation destination user. This allows the maintenance record of the presentation destination user to be updated. For example, the execution recognition unit 186 updates the maintenance record of the presentation destination user through specifying a user who executed the maintenance and the maintenance type executed by the user and incrementing the number of executions corresponding to the specified user and maintenance type.

The function of the useful information acquisition unit 187 will then be described. The useful information acquisition unit 187 acquires useful information for the presentation destination. For example, the useful information acquisition unit 187 acquires information on a coupon suitable for the interest or preference of the presentation destination user from the Internet via the communication device 15. The useful information acquisition unit 187 may acquire information on an advertisement in which, for example, information regarding the sale (sale goods) is described as substitute for or in addition to the coupon.

The function of the useful information output unit 188 will then be described. The useful information output unit 188 outputs the useful information for the presentation destination user. For example, the useful information output unit 188 outputs the useful information for the presentation destination user by adding the useful information for the presentation destination user to the second message which is output by the message output unit 185. The useful information output unit 188 may output the useful information for the presentation destination user at timing different from the output timing of the second message.

Figure 6:
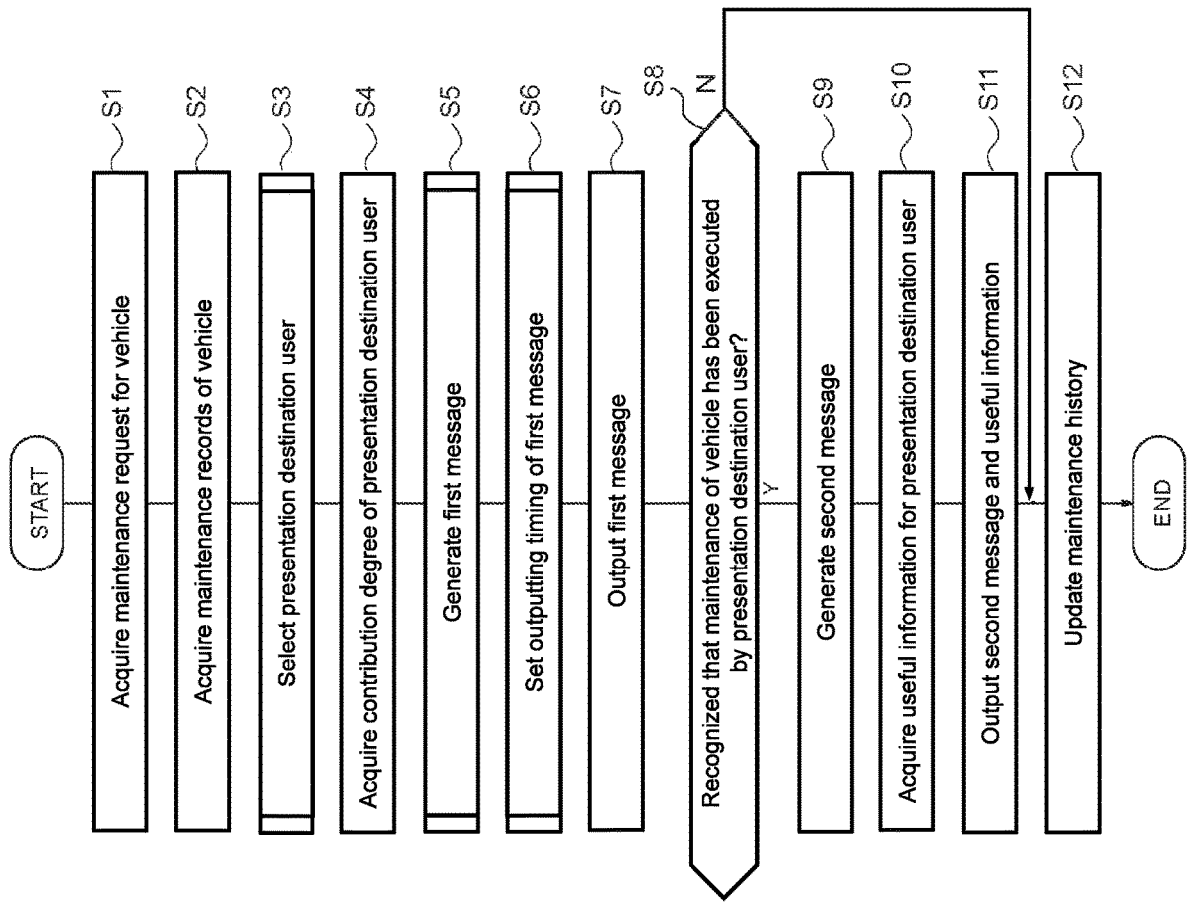
FIG. 6 is a flowchart illustrating a process executed by the information output device according to the present embodiment.

A process executed by the information output device 18 will then be described with reference to FIGS. 6 to 9. This process is executed in the information presentation system 100 which presents information regarding the maintenance of the vehicle 1 to one or more users. FIG. 6 is a flowchart illustrating the process executed by the information output device 18.

In step S1, the information output device 18 acquires a maintenance request for the vehicle 1. For example, the information output device 18 acquires the detection results detected by the remaining battery level sensor 11, the tire pressure sensor 12, and the liquid level sensor 13 at a predetermined cycle. The information output device 18 determines, based on the acquired detection results, whether or not the vehicle 1 needs maintenance. It is assumed that the information output device 18 acquires the maintenance request from the vehicle 1 at the timing when a determination is made that the vehicle 1 needs maintenance. In this step, the information output device 18 determines the requested maintenance type. In the subsequent steps, processing is executed for the determined maintenance type.

In step S2, the information output device 18 acquires the maintenance records of the vehicle 1 from the database 17 thereby to acquire the maintenance record of each of a plurality of users who can use the vehicle 1. The examples listed in FIG. 2 can be exemplified as examples of the maintenance records of the vehicle 1 and the maintenance record of each of the plurality of users included in the maintenance records of the vehicle 1.

Figure 7:
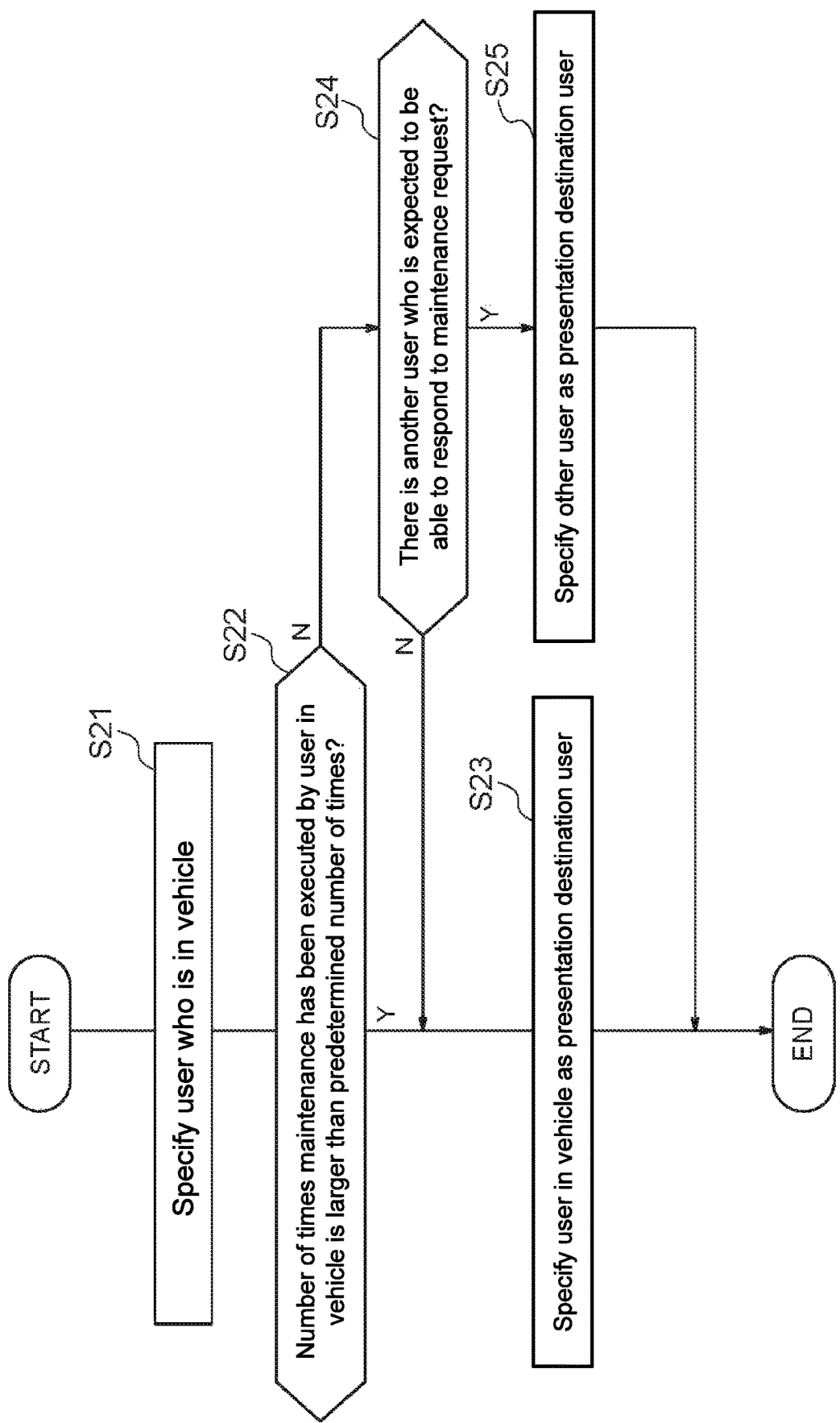
FIG. 7 illustrates a subroutine of step S3 illustrated in FIG. 6.

In step S3, the information output device 18 selects a presentation destination user who is the user to be presented with a message among the plurality of users. FIG. 7 illustrates a subroutine of step S3 illustrated in FIG. 6.

In step S21, the information output device 18 specifies a user who is in the vehicle 1. For example, the information output device 18 acquires the positional information from each of the plurality of terminals 2 to acquire the positional information of each of the plurality of users. In addition, the information output device 18 acquires the positional information from the vehicle 1. The information output device 18 compares the positional information of the vehicle 1 with the positional information of each user and specifies, as the user who is in the vehicle 1, a user located at the same position as the current position of the vehicle 1 among the plurality of users.

In step S22, the information output device 18 determines whether or not the number of times the maintenance has been executed by the user specified in step S21 is larger than a predetermined number of times. For example, the information output device 18 specifies the maintenance record of the user who is in the vehicle 1. In addition, the information output device 18 extracts the number of executions of the maintenance from the specified maintenance record. The maintenance type is a type corresponding to the maintenance request acquired in step S1 of FIG. 6. The predetermined number of times is a number of times for determining whether or not the user has an abundant maintenance experience, and is a predetermined number of times.

The information output device 18 compares the number of executions of the maintenance with the predetermined number of times. When the number of executions of the maintenance is larger than the predetermined number of times, the process proceeds to step S23, in which the information output device 18 selects the user who is in the vehicle 1 as the presentation destination user.

On the other hand, in step S22, when the number of executions of the maintenance is not larger than the predetermined number of times, the process proceeds to step S24. In step S24, the information output device 18 determines whether or not there is another user who is expected to be able to respond to the maintenance request. For example, when there is a user located within a predetermined range from the vehicle 1 among the plurality of users, the information output device 18 estimates that this user can respond to the maintenance request. In this case, the information output device 18 determines that there is another user who is expected to be able to respond to the maintenance request. On the contrary, when there are no other users within the predetermined range from the vehicle 1, the information output device 18 determines that there are no other users who are expected to be able to respond to the maintenance request.

When a determination is made in step S24 that another user exists, the process proceeds to step S25. In step S25, the information output device 18 selects the other user determined in step S24 as the presentation destination user.

When a determination is made in step S24 that there are no other users, the process proceeds to step S23, in which the information output device 18 selects the user who is in the vehicle as the presentation destination user.

When the presentation destination user is selected in step S23 or step S24, the process exits the subroutine illustrated in FIG. 7 and proceeds to step S4 of FIG. 6.

In step S4, the information output device 18 acquires the contribution degree of the presentation destination user selected in step S23 or step S24 of FIG. 7. The information output device 18 acquires, from the database 17, the contribution degree of the presentation destination user corresponding to the maintenance type requested by the maintenance request.

Figure 8:
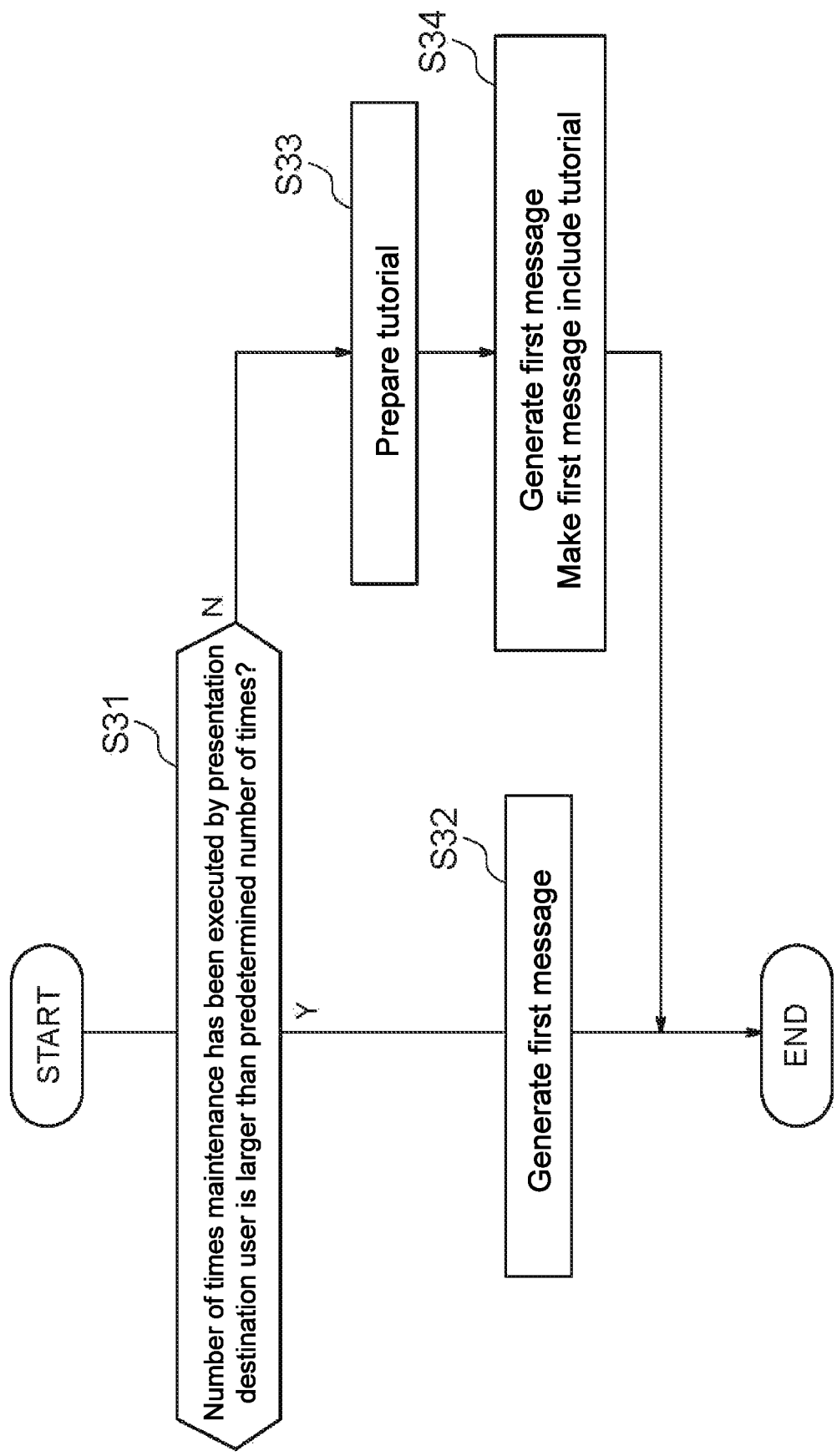
FIG. 8 illustrates a subroutine of step S5 illustrated in FIG. 6.

In step S5, the information output device 18 generates the first message which is a message for prompting the presentation destination user to perform the maintenance. FIG. 8 illustrates a subroutine of step S5 illustrated in FIG. 6.

In step S31, the information output device 18 determines whether or not the number of times the maintenance has been executed by the presentation destination user is larger than a predetermined number of times. The information output device 18 extracts the number of executions from the maintenance history of the presentation destination user and compares the number of executions with the predetermined number of times. When the number of executions of the maintenance is larger than the predetermined number of times, the process proceeds to step S32, while when the number of executions of the maintenance is not larger than the predetermined number of times, the process proceeds to step S33.

When a determination is made in step S31 that the number of executions of the maintenance is larger than the predetermined number of times, the process proceeds to step S32. In step S32, the information output device 18 generates the first message in accordance with the contribution degree of the presentation destination user acquired in step S4. The examples listed in FIG. 5 can be exemplified as examples of the first message.

When a determination is made in step S31 that the number of executions of the maintenance is not larger than the predetermined number of times, the process proceeds to step S33. In step S33, the information output device 18 prepares a work procedure manual (tutorial) in which the work procedure for maintenance of the vehicle 1 is explained.

In step S34, the information output device 18 generates the first message in accordance with the contribution degree of the presentation destination user acquired in step S4. In addition, the information output device 18 makes the first message include the tutorial prepared in step S33.

When the first message is generated in step S32 or step S34, the process exits the subroutine illustrated in FIG. 8 and proceeds to step S6 of FIG. 6.

Figure 9:
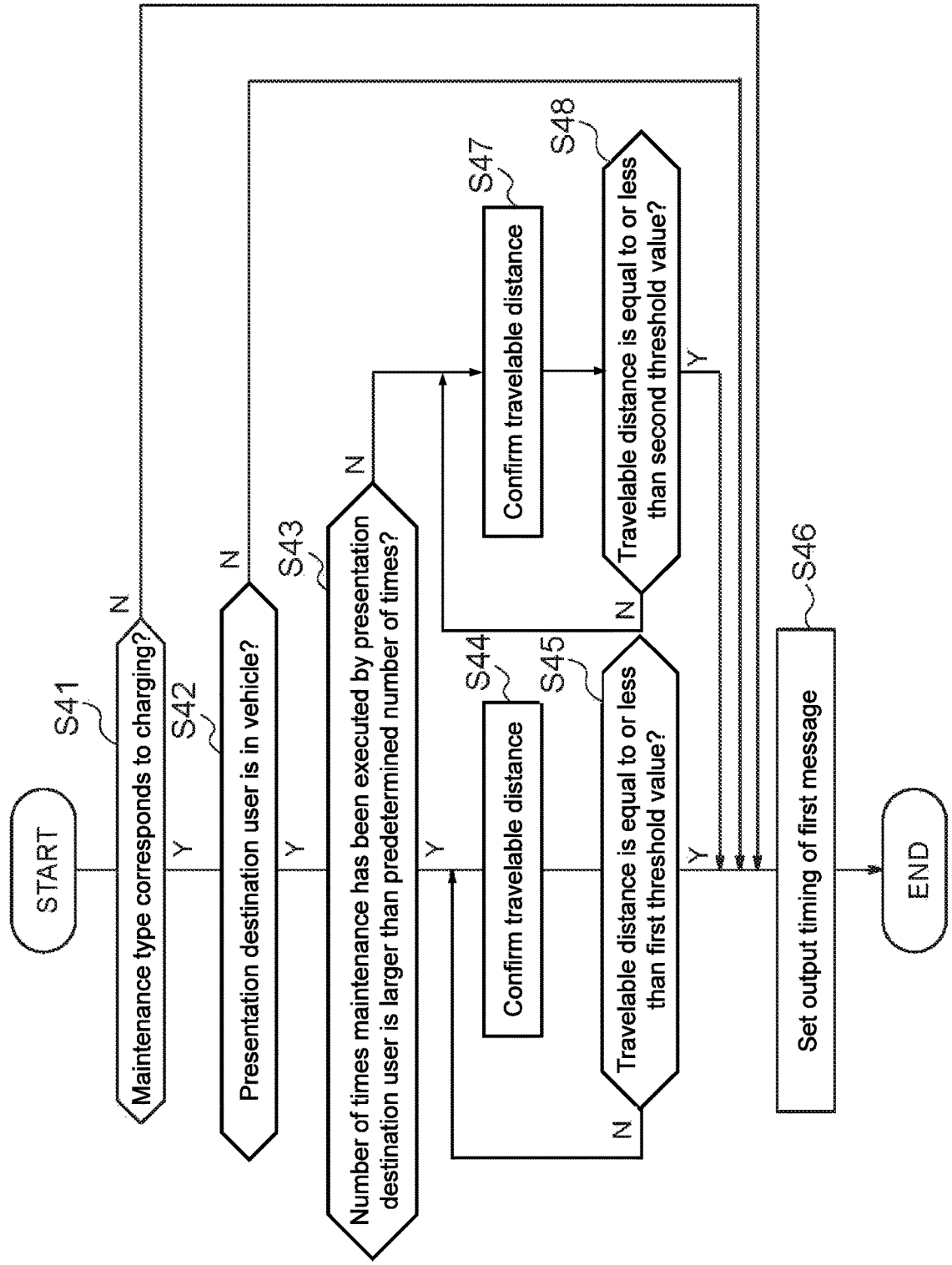
FIG. 9 illustrates a subroutine of step S6 illustrated in FIG. 6.

In step S6, the information output device 18 sets the timing to output the first message. FIG. 9 illustrates a subroutine of step S6 of FIG. 6.

In step S41, the information output device 18 determines the maintenance type acquired from the vehicle 1 and determines whether or not the maintenance type corresponds to charging. For example, the information output device 18 uses the processing result of step S1 of FIG. 6 to determine whether or not the maintenance type corresponds to charging. When the maintenance type corresponds to charging, the process proceeds to step S42, while when the maintenance type does not correspond to charging, the process proceeds to step S46.

When a determination is made in step S41 that the maintenance type corresponds to charging, the process proceeds to step S42. In step S42, the information output device 18 determines whether or not the presentation destination user is in the vehicle 1. For example, the information output device 18 can compare the positional information of the presentation destination user with the positional information of the vehicle 1 to determine whether or not the presentation destination user is in the vehicle 1. When a determination is made that the presentation destination user is in the vehicle 1, the process proceeds to step S43, while when a determination is made that the presentation destination user is not in the vehicle 1, the process proceeds to step S46.

When a determination is made in step S42 that the presentation destination user is in the vehicle 1, the process proceeds to step S43. In step S43, the information output device 18 determines whether or not the number of times the presentation destination user has executed the maintenance is larger than a predetermined number of times. When the number of executions of the maintenance is larger than the predetermined number of times, the process proceeds to step S44, while when the number of executions of the maintenance is not larger than the predetermined number of times, the process proceeds to step S47. The predetermined number of times is a reference number of times for determining whether or not the user has an abundant maintenance experience, and is a predetermined reference number of times.

When a determination is made in step S43 that the number of executions of the maintenance is larger than the predetermined number of times, the process proceeds to step S44. In step S44, the information output device 18 confirms the travelable distance of the vehicle 1 corresponding to the remaining battery level. In step S45, the information output device 18 compares the travelable distance confirmed in step S43 with a first threshold value and determines whether or not the travelable distance is equal to or smaller than the first threshold value. When a determination is made that the travelable distance is equal to or smaller than the first threshold value, the process proceeds to step S46. When the travelable distance is larger than the first threshold value, the process returns to step S44. The first threshold value is a threshold value for determining that a user with an abundant experience in charging can deal with the charging in good time, and is a predetermined threshold value. The first threshold value is set as a value that represents the distance.

When a determination is made in step S43 that the number of executions of the maintenance is not larger than the predetermined number of times, the process proceeds to step S47. In step S47, the information output device 18 confirms the travelable distance of the vehicle 1 corresponding to the remaining battery level. In step S48, the information output device 18 compares the travelable distance confirmed in step S46 with a second threshold value and determines whether or not the travelable distance is equal to or smaller than the second threshold value. The second threshold value is a value larger than the first threshold value. The second threshold value is a threshold value for determining that a user who has no experience or a shallow experience in charging can deal with the charging in good time, and is a predetermined threshold value. The second threshold value is set as a value that represents the distance. When a determination is made that the travelable distance is equal to or less than the second threshold value, the process proceeds to step S46. When the travelable distance is larger than the second threshold value, the process returns to step S47.

When the maintenance type does not correspond to charging in step S41, or when a determination is made in step S42 that the presentation destination user is not in the vehicle 1, or when a determination is made in step S45 that the travelable distance is equal to or less than the first threshold value, or when a determination is made in step S48 that the travelable distance is equal to or less than the second threshold value, the process proceeds to step S46. In step S46, the information output device 18 sets the output timing of the first message. For example, the information output device 18 sets the current time point as the output timing of the first message. Thus, in the present embodiment, the steps to be passed before proceeding to step S46 are different. In particular, when the maintenance type corresponds to charging, step S44 and step S45 are repeated, or steps S47 and S48 are repeated; therefore, the output timing of the first message can be changed. Moreover, the threshold values are used in accordance with the number of executions of charging, and the output timing of the first message can therefore be changed in accordance with the number of executions of charging.

When the output timing of the first message is set in step S46, the process exits the subroutine illustrated in FIG. 9 and proceeds to step S7 of FIG. 6.

In step S7, the information output device 18 outputs the first message. For example, when the presentation destination user is not in the vehicle 1, the information output device 18 transmits the first message to the terminal 2 carried by the presentation destination user via the communication device 15. On the other hand, when the presentation destination user is in the vehicle 1, for example, the information output device 18 outputs the first message to the output device 16.

In step S8, the information output device 18 determines whether or not it is recognized that the maintenance of the vehicle 1 has been executed by the presentation destination user. For example, when the remaining battery level after outputting the first message increases from the remaining battery level before outputting the first message, the information output device 18 recognizes that the maintenance of the vehicle 1 has been executed by the presentation destination user. When it is recognized that the maintenance of the vehicle 1 has been executed by the presentation destination user, the process proceeds to step S9, while when it cannot be recognized that the maintenance of the vehicle 1 has been executed by the presentation destination user, the process proceeds to step S12. A step for determining whether or not a predetermined time required for the maintenance has elapsed may be provided between step S7 and step S8.

In step S9, the information output device 18 generates the second message which is a message for expressing appreciation to the presentation destination user who has responded to the first message. The information output device 18 generates the second message in accordance with the contribution degree of the presentation destination user acquired in step S4. The examples listed in FIG. 5 can be exemplified as examples of the second message.

In step S10, the information output device 18 acquires useful information for the presentation destination user. For example, the information output device 18 acquires information on a coupon suitable for the interest or preference of the presentation destination user from the Internet via the communication device 15.

In step S11, the information output device 18 outputs the second message generated in step S9 and the useful information acquired in step S10. For example, the information output device 18 outputs the second message and the useful information using the same method as the method of outputting the first message in step S7.

In step S12, the information output device 18 updates the maintenance record of the presentation destination user. When the process proceeds from step S11 to step S12, the information output device 18 increments the number of executions corresponding to the maintenance type and stores the maintenance record of the presentation destination user in the database 17. On the other hand, when the process proceeds from step S8 to step S12, the information output device 18 decrements the contribution degree of the presentation destination user corresponding to the maintenance type, for example, in order to reflect that the maintenance has not been executed for the first message, and stores the contribution degree of the presentation destination user in the database 17. When the process of step S12 is completed, the information output device 18 concludes the processing.

As described above, the information output device 18 according to the present embodiment includes the request acquisition unit 181 configured to acquire a maintenance request for the vehicle 1, the user information acquisition unit 182 configured to acquire information regarding each of a plurality of users who can use the vehicle 1, the message generator 184 configured to generate a message associated with the maintenance request, and the message output unit 185 configured to output the message generated by the message generator 184. The user information acquisition unit 182 acquires maintenance records of the vehicle 1 that are records of maintenance executed for the vehicle 1 by the plurality of users. The message generator 184 selects, from among the plurality of users, a presentation destination user to be presented with the message. The message generator 184 generates the message based on a maintenance record of the presentation destination user among the maintenance records of the vehicle 1. The maintenance record of the presentation destination user is a record of the maintenance executed by the presentation destination user. Thus, by outputting the message in accordance with the attribute of the user, the user can be prompted to perform maintenance of the vehicle, and it is therefore possible to effectively motivate the user to execute the maintenance of the vehicle. As a result, the possibility that the maintenance is executed can be increased.

Moreover, in the present embodiment, the information output device 18 includes the execution recognition unit 186 configured to recognize that the presentation destination user has executed the maintenance requested by the maintenance request and store the recognized content in the database 17 as the maintenance record of the presentation destination user. Through this configuration, when the presentation destination user has executed the maintenance, the maintenance record of the presentation destination user is updated, and therefore the maintenance record of the user in which the action of the user is reflected can be stored.

Furthermore, in the present embodiment, the maintenance record of the presentation destination user includes the number of executions that is a number of times the presentation destination user has executed the maintenance requested by the maintenance request. The message generator 184 generates the message using an expression in accordance with the number of executions by the presentation destination user. It is possible to generate the message expressing the request and appreciation while taking into account the number of executions by the presentation destination user, and the user can therefore be easily given the impression that the vehicle 1 perceives the number of his/her own executions. As a result, it is possible to increase the possibility that the presentation destination user becomes attached to the vehicle 1.

In addition, in the present embodiment, the message generator 184 selects the presentation destination user based on a record of the maintenance executed by each of a plurality of users. This allows the presentation destination user to be selected based on the user's previous experience of maintenance. For example, it is possible to prevent a user who has no maintenance experience or a shallow maintenance experience from being selected as the presentation destination user. As a result, it is possible to increase the possibility that the maintenance is executed by the presentation destination user from the viewpoint of the user's experience of maintenance.

Moreover, in the present embodiment, the message generator 184 preferentially selects, as the presentation destination user, a user whose number of executions of maintenance for the vehicle 1 is larger among a plurality of users. Through this operation, a user who has an abundant experience in maintenance, that is, who is familiar with the maintenance and therefore has relatively little hesitation to the maintenance, can be selected as the presentation destination user.

Furthermore, in the present embodiment, the user information acquisition unit 182 acquires the positional information of each of a plurality of users. In addition, the message generator 184 selects the presentation destination user based on the positional information of each of the plurality of users. Through this operation, for example, a user who is located at a place away from the vehicle 1 can be prevented from being selected as the presentation destination user. As a result, it is possible to increase the possibility that the maintenance of the vehicle 1 is executed by the presentation destination user from the viewpoint of the distance to the vehicle 1.

In addition, in the present embodiment, the message generator 184 preferentially selects, based on the positional information of each of a plurality of users, a user whose position is closer to the vehicle 1 among the plurality of users as the presentation destination user. Through this operation, a user who is located at a place relatively close to the vehicle 1 can be selected as the presentation destination user.

Moreover, in the present embodiment, the user information acquisition unit 182 specifies a user who is in the vehicle 1 among a plurality of users. In addition, the message generator 184 selects the user who is in the vehicle 1 as the presentation destination user. Through this operation, a user who is in the vehicle 1 requiring maintenance and who needs the maintenance can be selected as the presentation destination user.

Furthermore, in the present embodiment, the information output device 18 includes the contribution degree acquisition unit 183 configured to acquire the contribution degree of the presentation destination user to the maintenance or improvement of the state of the vehicle 1. The contribution degree is based on the maintenance record of the presentation destination user. The message generator 184 generates the message in accordance with the contribution degree of the presentation destination user. Through this operation, it is possible to generate the message in which the expression method is different between a user who does not execute the maintenance even though the maintenance is prompted, for example, and a user who has executed the maintenance in response to the prompt. As a result, the user is likely to feel that the vehicle 1 perceives his/her own situation, and the user becomes attached to the vehicle 1.

In addition, in the present embodiment, the message generator 184 generates, with a trigger that the maintenance request is acquired, the first message which is the message for prompting or requesting the user to execute the maintenance. This allows the maintenance to be promoted or requested at the timing when the maintenance is required for the vehicle 1.

Moreover, in the present embodiment, the message generator 184 determines, based on the maintenance record of the presentation destination user, whether or not the number of executions that is a number of times the presentation destination user has executed the maintenance requested by the maintenance request is larger than a preliminarily set reference number of times. Then, when a determination is made that the number of executions is not larger than the reference number of times, the message generator 184 generates the first message including a work procedure manual in which the work procedure of maintenance requested by the maintenance request is explained. Through this operation, a user who has no maintenance experience or a shallow maintenance experience can execute the maintenance in accordance with the work procedure manual. As a result, it is possible to increase the possibility that the user executes the maintenance of the vehicle in accordance with the content of the message.

Furthermore, in the present embodiment, the message output unit 185 outputs the first message at the timing in accordance with the maintenance record of the presentation destination user. Through this operation, when the maintenance type corresponds to charging, for example, a user who has no experience or a shallow experience in the charging work can confirm the location of a charging stand in good time. As a result, it is possible to increase the possibility that the user executes the maintenance for the first message prompting the maintenance.

In addition, in the present embodiment, the message generator 184 generates, with a trigger that the execution recognition unit 186 recognizes that the maintenance of the vehicle 1 has been executed by the presentation destination user, the second message that is a message to appreciate the user. Through this operation, it is possible to express appreciation for the execution at the timing when the maintenance of the vehicle 1 is completed.

Moreover, in the present embodiment, the information output device 18 includes the useful information acquisition unit 187 configured to acquire useful information for the presentation destination user and the useful information output unit 188 configured to output the useful information for the presentation destination user when the execution recognition unit 186 recognizes that the maintenance of the vehicle 1 has been executed by the presentation destination user. This can increase the possibility that the user who has executed the maintenance in response to the message prompting the maintenance executes the maintenance at the next opportunity. In addition, the hesitation to the first message can be alleviated.

Furthermore, in the present embodiment, the message output unit 185 outputs the message to the terminal 2 capable of presenting the message to the presentation destination user. This allows the presentation destination user to confirm the message from the information output device 18 via the terminal 2.

In addition, in the present embodiment, the maintenance of the vehicle 1 includes at least one of charging, checking, and washing of the vehicle 1. These items are essential items for maintaining or improving the vehicle 1, and it is possible to increase the number of users who can respond to such items without hesitation.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, the program executed by the control device 180 has been described by exemplifying a program stored in the storage device 190 which serves as a ROM, but the storage location of the program may be outside the information output device 18. For example, the program executed by the control device 180 may be stored in a recording medium that can be read by a computer. In this case, by connecting the recording medium and the information output device 18 using some method/standard, the control device 180 can execute the program recorded on the recording medium.

Moreover, in the present embodiment, the vehicle 1 has been described by exemplifying an electric vehicle that requires external charging, for example, but the vehicle 1 may be a gasoline-powered vehicle that travels by using a gasoline engine as the power source. In this case, refueling can be adopted as the maintenance of the vehicle 1 as substitute for charging.

Furthermore, the present embodiment has been described by exemplifying the configuration of generating the first message and the second message in accordance with the number of executions and contribution degree by the presentation destination user, for example, but the first message and the second message may be generated based on other attributes of the presentation destination user.

For example, the information output device 18 evaluates the driving operation of the user who drives the vehicle 1, based on the onboard device of the vehicle 1 (such as a vehicle speed sensor, a steering angle sensor, or a door opening/closing switch). When the presentation destination user is a user who drives the vehicle 1, the information output device 18 may generate the first message and the second message based on the evaluation of the driving operation performed by the presentation destination user. For example, for the presentation destination user whose driving operation is relatively rough, the first message may be made to include a message notifying that the driving operation is relatively rough. Then, when the presentation destination user has executed maintenance, the information output device 18 may make the second message include a message notifying that, like maintenance, the driving operation also affects the maintenance or improvement of the vehicle 1. If the user himself/herself is not aware of the roughness of the driving operation, he/she can be given an opportunity to review his/her own driving operation.

Moreover, the present embodiment has been described by exemplifying a configuration of generating the first message and the second message by using an expression in accordance with the number of executions or contribution degree of the presentation destination user, for example, but the message generator 184 may generate the first message and the second message by using an expression in accordance with the number of executions and contribution degree of the presentation destination user. For example, the message generator 184 may preliminarily define whether to prioritize the number of executions or the contribution degree for each maintenance type and may generate the first message and the second message by using an expression in accordance with the number of executions or contribution degree of the presentation destination user. Alternatively, the message generator 184 may use an expression in accordance with the number of executions for the first message and an expression in accordance with the contribution degree for the second message. Alternatively, the message generator 184 may use an expression in accordance with the contribution degree for the first message and an expression in accordance with the number of executions for the second message.

Furthermore, the present embodiment has been described by exemplifying a configuration of generating the first message including a work procedure manual when the number of executions by the presentation destination user is not larger than a reference number of times, for example, but the first message may be made to include other information for easily executing the maintenance. For example, the information output device 18 may make the first information include a place at which the maintenance is performed (e.g., the place of a charging station in the vicinity of the vehicle 1) as substitute for or in addition to the work procedure manual.

Moreover, the present embodiment has been described by exemplifying three methods as the method of selecting the presentation destination user, for example, but the method of selecting the presentation destination user may be another method. For example, the information output device 18 according to a modified example may select the presentation destination user in accordance with the relationship between the maintenance type and the presentation destination user. When the maintenance type is a costly type, such as charging, checking, or vehicle inspection, the information output device 18 according to the modified example may select the presentation destination user in accordance with the configuration of a plurality of users. For example, in the case of a family of four exemplified in the present embodiment, the information output device 18 according to the modified example may preferentially select the father or the mother as the presentation destination user. Through this operation, a user who has relatively little hesitation to the cost required for executing the maintenance can be selected as the presentation destination user, and it is therefore possible to increase the possibility that the maintenance of the vehicle 1 is executed by the presentation destination user from the viewpoint of the cost required for the maintenance.

Furthermore, when the presentation destination user is not in the vehicle 1 and another user is in the vehicle 1, the information output device 18 according to the modified example may output the first message to the presentation destination user and a message notifying the user in the vehicle 1 that maintenance is required and that the first message has been output to the presentation destination user. This allows the user in the vehicle 1 to move the vehicle 1 to the location of the presentation destination user. Rather than outputting the first message only to the presentation destination user, the user in the vehicle 1 becomes cooperative with the maintenance, and as a result, it is possible to increase the possibility that the maintenance is executed by the presentation destination user.

DESCRIPTION OF REFERENCE NUMERALS

1 Vehicle
    11 Remaining battery level sensor
    12 Tire pressure sensor
    13 Liquid level sensor
    14 Imaging device
    15 Communication device
    16 Output device
    17 Database
    18 Information output device
        180 Control device
            181 Request acquisition unit
            182 User information acquisition unit
            183 Contribution degree acquisition unit
            184 Message generator
            185 Message output unit
            186 Execution recognition unit
            187 Useful information acquisition unit
            188 Useful information output unit
        190 Storage device
2 Terminal
    21 Input device
    22 Output device
    23 Communication device
3 Network
100 Information presentation system

The invention claimed is:

1. An information output device comprising:
a request acquisition unit configured to acquire a maintenance request for a vehicle;
a user information acquisition unit configured to acquire information regarding each of a plurality of users who can use the vehicle;
a message generator configured to generate a message associated with the maintenance request acquired by the request acquisition unit; and
a message output unit configured to output the message generated by the message generator,
the user information acquisition unit acquiring maintenance records of the vehicle that are records of maintenance executed for the vehicle by the plurality of users,
the message generator selecting, from among the plurality of users, a presentation destination user to be presented with the message and generating the message based on a maintenance record of the presentation destination user among the maintenance records of the vehicle, the maintenance record of the presentation destination user being a record of the maintenance executed by the presentation destination user.

2. The information output device according to claim 1, comprising:
an execution recognition unit configured to recognize that the presentation destination user has executed the maintenance requested by the maintenance request and store recognized content in a database as the maintenance record of the presentation destination user.

3. The information output device according to claim 1, wherein
the maintenance record of the presentation destination user includes a number of executions that is a number of times the presentation destination user has executed the maintenance requested by the maintenance request, and
the message generator generates the message using an expression in accordance with the number of executions.

4. The information output device according to claim 1, wherein the message generator selects the presentation destination user based on a record of the maintenance executed by each of the plurality of users.

5. The information output device according to claim 4, wherein
the maintenance records of the vehicle include a number of executions of the maintenance requested by the maintenance request, and
the message generator preferentially selects, as the presentation destination user, a user whose number of executions is larger among the plurality of users.

6. The information output device according to claim 1, wherein
the user information acquisition unit acquires positional information of each of the plurality of users, and
the message generator selects the presentation destination user based on the positional information of each of the plurality of users acquired by the user information acquisition unit.

7. The information output device according to claim 6, wherein the message generator preferentially selects, based on the positional information of each of the plurality of users, a user whose position is closer to the vehicle among the plurality of users as the presentation destination user.

8. The information output device according to claim 1, wherein
the user information acquisition unit specifies a user who is in the vehicle among the plurality of the users, and
the message generator selects, as the presentation destination user, the user who is in the vehicle specified by the user information acquisition unit.

9. The information output device according to claim 1, comprising:
a contribution degree acquisition unit configured to acquire a contribution degree of the presentation destination user to maintenance or improvement of a state of the vehicle, the contribution degree being based on the maintenance record of the presentation destination user,
wherein the message generator generates the message in accordance with the contribution degree of the presentation destination user acquired by the contribution degree acquisition unit.

10. The information output device according to claim 1, wherein the message generator generates, with a trigger that the maintenance request is acquired by the request acquisition unit, a first message that is the message for prompting or requesting the user to execute the maintenance.

11. The information output device according to claim 10, wherein the message generator is configured to:
determine, based on the maintenance record of the presentation destination user acquired by the user information acquisition unit, whether or not a number of executions that is a number of times the presentation destination user has executed the maintenance requested by the maintenance request is larger than a preliminarily set reference number of times or whether or not an execution frequency that is a frequency that the presentation destination user has executed the maintenance requested by the maintenance request is higher than a preliminarily set reference frequency, and when determining that the number of executions is not larger than the reference number of times or when determining that the execution frequency is not higher than the reference frequency, make the first message include information for explaining a work procedure of the maintenance requested by the maintenance request.

12. The information output device according to claim 10, wherein the message output unit outputs the first message at timing in accordance with the maintenance record of the presentation destination user.

13. The information output device according to claim 10, comprising:
an execution recognition unit configured to recognize that the presentation destination user has executed the maintenance requested by the maintenance request and store recognized content in a database as the maintenance record of the presentation destination user,
wherein the message generator generates, with a trigger that the execution recognition unit recognizes that the maintenance of the vehicle has been executed by the presentation destination user, a second message that is the message to appreciate the user for responding to the first message.

14. The information output device according to claim 13, comprising:
a useful information acquisition unit configured to acquire useful information for the presentation destination user; and
a useful information output unit configured to, when the execution recognition unit recognizes that the maintenance requested by the maintenance request has been executed by the presentation destination user, output the useful information for the presentation destination user acquired by the useful information acquisition unit.

15. The information output device according to claim 1, wherein the message output unit outputs the message to a terminal capable of presenting the message to the presentation destination user.

16. The information output device according to claim 1, wherein the maintenance of the vehicle includes at least one of charging, refueling, checking, and washing of the vehicle.

17. An information output method for outputting a message using a computer, the information output method comprising:
acquiring a maintenance request for a vehicle;
executing an information acquisition process to acquire information regarding each of a plurality of users who can use the vehicle;
selecting, from among the plurality of users, a presentation destination user to be presented with the message associated with the maintenance request;
executing a generation process to generate the message associated with the maintenance request;
outputting the message generated by the generation process;
acquiring, in the information acquisition process, a maintenance record of the vehicle that is a record of maintenance executed for the vehicle by each of the plurality of users; and
generating, in the generation process, the message based on the maintenance record of the presentation destination user.

* * * * *